U S009982796B2

(12) United States Patent
Perner et al.

(10) Patent No.: US 9,982,796 B2
(45) Date of Patent: *May 29, 2018

(54) VALVE-BODY ARRANGEMENT AND METHOD FOR PRODUCING IT, AND VALVE HAVING THE VALVE-BODY ARRANGEMENT

(71) Applicant: Rausch & Pausch GmbH, Selb (DE)

(72) Inventors: Frank Perner, Plauen (DE); Tino Zeidler, Tirpersdorf (DE); Herwig Greiner, Neuenmarkt (DE); Werner Schieweck, Thierstein (DE)

(73) Assignee: Rausch & Pausch GmbH, Selb (DE)

( * ) Notice: Subject to any disclaimer, the term of this patent is extended or adjusted under 35 U.S.C. 154(b) by 148 days.

This patent is subject to a terminal disclaimer.

(21) Appl. No.: 15/213,724

(22) Filed: Jul. 19, 2016

(65) Prior Publication Data
US 2016/0327173 A1 Nov. 10, 2016

Related U.S. Application Data

(63) Continuation of application No. 14/122,203, filed as application No. PCT/EP2012/059505 on May 22, 2012, now Pat. No. 9,423,043.

(30) Foreign Application Priority Data

May 23, 2011 (DE) .................. 10 2011 076 260

(51) Int. Cl.
*F16K 27/10* (2006.01)
*F16K 15/14* (2006.01)
(Continued)

(52) U.S. Cl.
CPC .............. *F16K 27/10* (2013.01); *B29B 11/08* (2013.01); *B29C 65/16* (2013.01); *B29C 65/1635* (2013.01); *F16K 15/144* (2013.01); *F16K 17/0453* (2013.01); *F16K 27/0236* (2013.01); *B29K 2105/12* (2013.01);
(Continued)

(58) Field of Classification Search
CPC .. F16K 27/10; F16K 27/0236; F16K 17/0453; F16K 15/144; B29B 11/08; B29C 65/16; B29C 65/1635; F16F 2226/048; F16F 9/34; B29K 2105/12; B29L 2031/7506; Y10T 137/0497; Y10T 29/49405
USPC ................ 137/15.18, 15.19; 251/331, 335.2, 251/129.17, 129.21, 61.1–61.2, 61.5
See application file for complete search history.

(56) References Cited

U.S. PATENT DOCUMENTS

| 4,717,117 A | 1/1988 | Cook |
|---|---|---|
| 4,969,629 A | 11/1990 | Athanassiu |

(Continued)

FOREIGN PATENT DOCUMENTS

WO WO 93/05972 A1 4/1993

OTHER PUBLICATIONS

English translation of International Search Report issued in International Application No. PCT/EP2012/059505 dated Jun. 6, 2012 (4 pgs.).

*Primary Examiner* — John Bastianelli
(74) *Attorney, Agent, or Firm* — Maier & Maier, PLLC (57) ABSTRACT

A valve body arrangement for a hydraulic or pneumatic valve comprises two elements between which a valve body is retained. The two elements are welded together in a first region, preferably by the laser transmission method, and clamp the valve body in a second region with a force.

10 Claims, 5 Drawing Sheets

(51) Int. Cl.
  *F16K 17/04* (2006.01)
  *F16K 27/02* (2006.01)
  *B29C 65/16* (2006.01)
  *B29B 11/08* (2006.01)
  *B29K 105/12* (2006.01)
  *B29L 31/00* (2006.01)
  *F16F 9/34* (2006.01)

(52) U.S. Cl.
  CPC ......... *B29L 2031/7506* (2013.01); *F16F 9/34* (2013.01); *F16F 2226/048* (2013.01); *Y10T 29/49405* (2015.01); *Y10T 137/0497* (2015.04)

(56) References Cited

U.S. PATENT DOCUMENTS

| | | |
|---|---|---|
| 5,158,263 A | 10/1992 | Shimizu et al. |
| 5,374,029 A | 12/1994 | Bailey |
| 5,758,865 A | 6/1998 | Casey |
| 6,086,041 A | 7/2000 | Gattuso et al. |
| 6,637,723 B1 | 10/2003 | Pedersen et al. |
| 7,141,978 B2 | 11/2006 | Peck et al. |
| 8,162,006 B2 | 4/2012 | Guala |
| 8,641,011 B2 | 2/2014 | Scherer et al. |
| 8,689,817 B2 | 4/2014 | Leys et al. |
| 8,695,636 B2 | 4/2014 | Kuhnle et al. |
| 2006/0245951 A1 | 11/2006 | Ball |

VALVE-BODY ARRANGEMENT AND METHOD FOR PRODUCING IT, AND VALVE HAVING THE VALVE-BODY ARRANGEMENT

This application is a continuation application of U.S. application Ser. No. 14/122,203, entitled "Valve-body arrangement and method for producing it, and valve having the valve-body arrangement," filed Nov. 25, 2013, which is a § 371 Application of International Application No. PCT/EP2012/059505, filed May 22, 2012, which claimed priority from German Patent Application No. 10 2011 076 260.4, filed May 23, 2011, the entire contents of which are hereby incorporated by reference in their entirety.

This invention relates to a valve as can be used in particular in hydraulic and pneumatic systems, relating in particular to a valve body arrangement for such a valve as well as a method for manufacture thereof.

In particular, the valve can be employed as a residual pressure holding valve for an air suspension of a vehicle. Arranged on the air spring cup of an air strut, a residual pressure holding valve serves to hold a residual pressure in the air strut, in particular when the air strut is not connected to an air spring system. This is the case for example when the air strut is mounted or transported separately. It is also necessary for holding a residual pressure in the air strut when pumps are switched off which pressurize the air suspension, for example when the vehicle is parked. By means of a residual pressure holding valve, a certain pressure can be maintained in the air strut over a long time period.

Generally, hydraulic and pneumatic flow valves comprise at least one pressure or flow inlet, at least one pressure or flow outlet, and at least one valve body with which one or several inlets and/or outlets are closable. The valve body is, for this purpose, retained in a suitable manner in a valve housing, whereby actuators—such as for example a biasing spring—can serve to retain the valve body in a given, for example closed, position in dependence on pressures and flow forces.

Depending on the type of valve body, special measures are required for retaining the valve body in the desired position in the valve housing. While the valve body normally assumes a defined position as long as it is retained in the closed position against a passage opening by a biasing spring for example, it can assume an undefined position as soon as the flow forces overcome the spring biasing force. This problem occurs for example with planar valve bodies, such as for example sealing disks. To ensure a reliable position of such valve bodies in every closed and open position, the valve body is fixed in a localized manner between two parts of the valve housing. Thus, it is known to clamp sealing disks between two parts of the valve housing in their edge region, while the central part of the sealing disk closes a flow inlet under spring bias and, upon overcoming of the spring biasing force, moves and releases a flow path. Concretely, it is known in this connection to clamp the sealing disk in a depression of the valve housing, made for example of cast aluminum, by means of a component cold-calked in this depression such that the sealing disk follows the necessary valve motions without shifting uncontrolledly within the valve housing. The clamping forces are difficult to adjust, however, and the reliable seal between the two components is also problematic.

The object of the invention is to improve such a valve body arrangement with regard to manufacturing technology.

This object is achieved by a valve body arrangement and a method for manufacture thereof having the features of the independent claims. Claims dependent thereon state advantageous configurations and developments of the invention.

According to a preferred embodiment of the method according to the invention for manufacturing a valve body arrangement having a valve body retained between two elements, the valve body is first arranged between the two elements in a first region, such that the two elements directly border on each other in a second region different therefrom. In this directly mutually bordering second region the two elements are then interconnected in a primary shaping process such that the valve body is reliably retained in the first region between the two elements.

Connecting the two elements in the primary shaping process comprises in particular welding the two elements together to the effect that the two elements superficially melt on their surface and melt together, so that after their cooling they are interconnected in a material-locking manner. The primary shaping process can also relate to only one of the two elements, however, to the effect that the surface of one of the two elements is superficially melted and flows into pores and/or undercuts on the surface of the other element, resulting in a form-locking connection between the two elements. A combination of these two mechanisms is of course also possible in such a way that the element provided with pores or undercuts also at least partly melts superficially and melts together with the material of the other element.

After the primary shaping process, that is, after cooling, the two elements are firmly interconnected and cannot be separated without destruction. Thus, the valve body is retained stationarily between the two elements. This can happen in a variety of ways, for example in a form-locking and preferably force-locking manner. In the case of a form-locking mount, there can be provided for example gaps in the valve body which are engaged by one or the other element when the valve body is being arranged between the two elements. In the case of a disk-shaped seal, it is thereby possible to prevent the sealing disk from slipping for example in the lateral direction, without blocking the mobility of the sealing disk in the vertical direction.

The invention is particularly suited, however, for a force-locking mount of the valve body between the two elements such that the valve body is clamped in between the two elements. For this purpose, there is exerted on the two elements during the connecting in the primary shaping process or during the superficial melting a force which is "frozen", so to speak, by the cooling and the reentry of the superficially melted material into the solid phase. The valve body then remains lastingly clamped in between the two elements with exactly the force with which the two elements and the intermediate valve body were clamped against each other during the primary shaping process. The retaining force or clamping force can thus be preadjusted in a simple manner.

There are again numerous ways of doing this, two preferred variants being explained more closely hereinafter. According to one variant, the connecting interface on which the two elements are welded together is perpendicular to the direction of the retaining force with which the valve body is retained between the two elements. To increase in this situation the retaining force acting on the valve body, the two elements must be moved toward each other. This can be effected in a simple manner by the material superficially melted in the primary shaping process being displaced to the side for example.

Alternatively, the connecting interface or welding interface between the two elements can be parallel to the retaining force direction with which the valve body is retained between the two elements. The two elements then slide past each other within the region of the connecting interface and clamp the valve body between themselves with the retaining force at a different place. This retaining force is "frozen" as soon as the two elements have been firmly interconnected at the connecting interface in the primary shaping process.

At least one or preferably both elements comprise plastic material by means of which they can be interconnected in a form-locking and or material-locking manner in the primary shaping operation. It is particularly preferable to superficially melt the two elements by means of a laser, in particular using the laser transmission method. For this purpose, one element comprises a first material which is partly or completely transmissive to laser radiation of a certain wavelength, and the other element comprises a second material which is completely absorbent to the same laser radiation, or at least more strongly absorbent than the first material. By the laser transmission method the laser beam then radiates through the laser beam transmissive material and is absorbed in the second material of the other element. This second material then melts superficially or heats up so strongly that the first material melts superficially, or both materials melt superficially, so that, after cooling, a firm connection arises between the two elements in the relevant region.

The described valve body arrangement is quite easy to manufacture in terms of process engineering, in particular when it comes to mass production. Due to the primary shaping process there results a leakage-free seal between the two elements. Because the connection created by means of the primary shaping process already achieves a mutual seal of the elements, one can dispense with further seals, such as sealing rings, thereby saving room and installation space. A further advantage is that the valve body arrangement, because one or both elements can consist of plastic, is considerably lighter than conventional valve body arrangements of the present kind. A necessary elevated strength of the elements can be obtained when glass fiber reinforced plastic material is employed.

A further advantage is that, when the two elements of the valve body arrangement are made of plastic, they can be manufactured inexpensively as injection molded parts. Glass fiber reinforced plastic can also be processed by injection molding. However, the elements can e.g. also be made of turned parts.

In a preferred exemplary embodiment, the valve body arrangement can comprise a third element which is connected in a form-locking and/or material-locking manner by a primary shaping process to the second element in a third region different from the first and second regions. The third element is preferably arranged with regard to the valve body on a side of the valve body opposing the first element. The valve inlet can be arranged in the first element, and the valve outlet in the third element.

Preferably, the third element is configured such that the valve inlet which is preferably arranged in the first element and the valve outlet which is preferably arranged in the third element are arranged coaxially. If the valve arrangement only comprises two elements, the valve outlet is preferably arranged in the second element. However, for constructional reasons the valve outlet is then arranged offset from the valve inlet in the first element of the valve arrangement upon employment of a planar valve body, such as a sealing disk or a membrane. Providing a third element which comprises the valve outlet makes it possible to arrange the valve inlet and the valve outlet coaxially, because the valve passage can thus be guided around the planar valve body. A valve arrangement having three elements can thus be configured especially narrow.

The previously explained features and properties relating to the connection of the first element with the second element are advantageously also applicable to the connection of the third element with the second element. In particular, a leakage-free seal also results between the third element and the second element, as between the first element and the second element, due to the primary shaping process, such as laser welding, without requiring further seals which would need space. The small radial dimension of the valve arrangement having three elements can thus be further reduced compared with a configuration having additional seals.

The valve body arrangement is advantageously employable in a valve for closing a through opening therein in a first position and releasing it in a second position. Advantageously, the valve body arrangement is combined in such a valve with a biasing element, for example a biasing spring which urges the valve body into one of the two positions. Depending on the pressure relations existing at the through opening on one and/or the other side, the biasing force of the biasing element is then overcome and the valve body moves into the other one of the two positions. The valve is preferably employed as a residual pressure holding valve for an air spring system of a vehicle.

Advantageously, there is provided an air strut which comprises the above-described valve, in particular as a residual pressure holding valve. The valve is then preferably arranged on the air spring cup of the air strut and allows a predetermined pressure to be held in the air strut.

Hereinafter the invention will be explained more closely by way of example with reference to the accompanying drawings. Therein are shown.

Figure 1A:
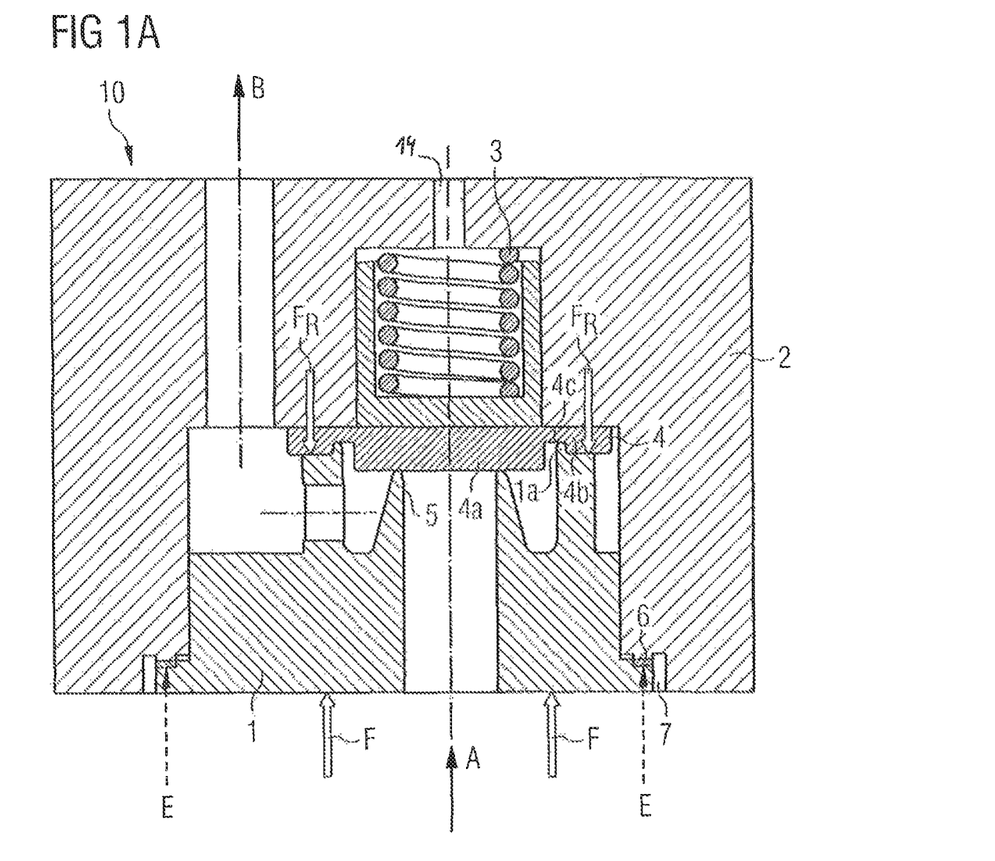
FIG. 1A a valve having a valve body arrangement according to a first exemplary embodiment in the closed position, FIG. 1B the valve from FIG. 1A in the open position, FIG. 2A a valve having a valve body arrangement according to a second exemplary embodiment in the closed position, FIG. 2B the valve from FIG. 1B in the open position, and FIG. 3 a valve having a valve body arrangement according to a third exemplary embodiment in the closed position.

FIG. 1A shows the arrangement of a valve body 4 in a valve 10, which can be for example a hydraulic or pneumatic valve. The valve 10 possesses a flow inlet A and a flow outlet B as well as a valve body 4 which blocks a passage between A and B. The pressure present on the flow inlet acts on a central region 4a of the valve body 4 configured as a sealing disk or membrane. From the opposing side the valve body 4 is urged axially by means of a biasing spring 3 against a sealing collar 5. In this position the valve body 4 closes the flow inlet A.

Figure 1B:
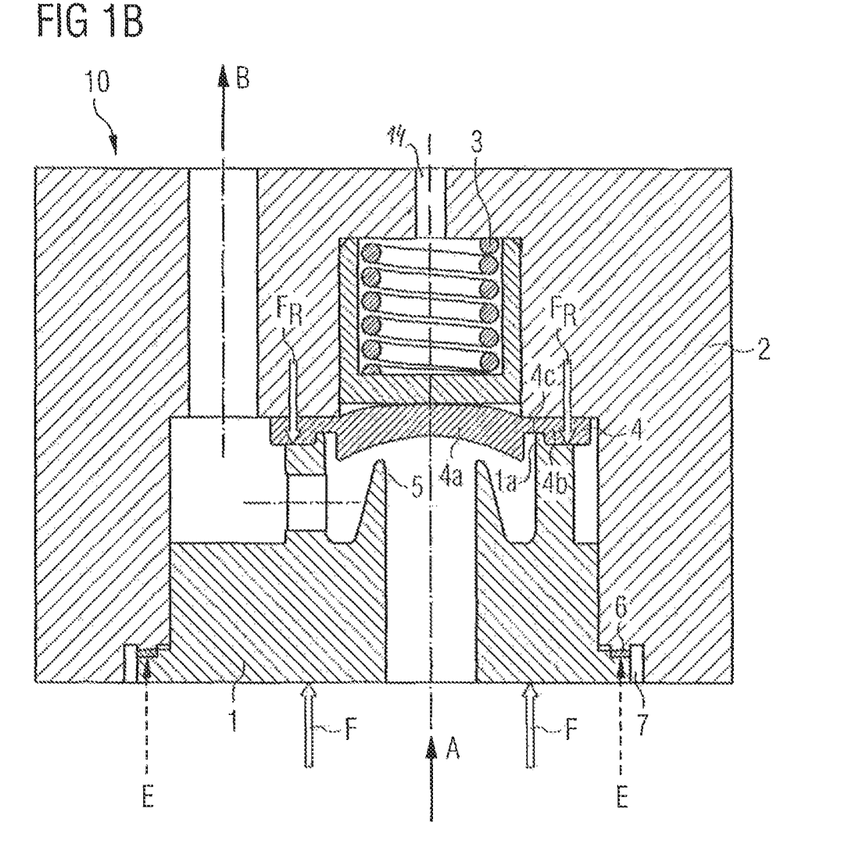

As soon as the pressure present at the inlet A overcomes the opposing force exerted on the valve body 4 by the biasing spring 3, the valve body 4 moves or is deformed in its central region 4a and releases a passage to the outlet B, as represented in FIG. 1B. The motion or deformation of the valve body 4 is facilitated by a pressure compensation bore 14. To avoid an unintentional lateral shift of the valve body 4 at this moment of the open valve state, the valve body 4 is retained radially outside in an edge region 4b. For this purpose, the valve housing of the valve 10 comprises two elements 1 and 2 between which the valve body 4 is retained. In the represented exemplary embodiment, the valve body 4 is clamped in between the two elements 1 and 2 with a prescribed retaining force $F_R$ and thus retained in a force-locking manner. In addition, the valve body 4 is also prevented from slipping in the radial direction by form-locking engagement. For this purpose, a lug 1a of the element 1 engages a depression 4c of the valve body 4 which is located radially inside from the edge region 4b of the valve body 4.

The two elements 1 and 2 are firmly interconnected. For this purpose, the element 1 is seated on a circumferential, axially protruding bearing shoulder 6 of the element 2 and welded to the element 2 continuously in this region. This results in a leakage-free seal of the elements 1 and 2, on the one hand, and in a firm connection of these two elements, on the other hand. At the same time, the retaining force $F_R$ can be adjusted with which the valve body is clamped in between the two elements, by urging the element 1 against the valve body 4 with a force F during the welding process. The superficially melted material in the region of the bearing shoulder 6 thus flows laterally into a recess 7, and the element 1 moves toward the element 2 to the corresponding extent until further motion is prevented by the valve body 4. From this moment the valve body 4 is retained between the two elements 1 and 2 with the defined force F or the reaction force $F_R$, and this retaining force $F_R$ is "frozen" as soon as the connecting point is sufficiently cooled and the superficially melted materials have passed into a solid state again. As explained at the outset, the same result can be achieved also when material of only one of the two elements is superficially melted. The retaining force $F_R$ per unit area of the region 4b, i.e. the compression pressure in the region 4b, is considerably greater due to the small surface area of the region 4b than the pressure force F per unit area of the element 1, or than the contact pressure. Hence, a high compression pressure in the region 4b can already be achieved with low forces F.

The superficial melting in the region of the bearing shoulder 6 is effected in this exemplary embodiment by means of a laser by the laser transmission method. For this purpose, the first element consists, at least in the region to be penetrated by radiation, of a material that is partly or preferably completely transmissive to laser radiation E of a certain wavelength. The element 2 has in contrast, at least in the region of the bearing shoulder 6, a material that is preferably completely absorbent to the same laser radiation E, but at least more strongly absorbent than the material of the element 1. The energy supplied by means of the laser beam thus heats the material of the element 2 in the relevant region. This has the consequence that the material of the element 2 superficially melts in this region and that due to the heat transmission the material of the element 1 also superficially melts in the accordingly bordering region. Hence, both materials are preferably plastics which in this way produce a material-locking connection between the two elements 1 and 2.

It is equally possible, however, that only one of the two materials superficially melts. For example, the element 2 can be metallic or a plastic with a high melting point and heat up without superficially melting such that only the other element 1, which consists for example of plastic with a relatively low melting point, superficially melts in the accordingly bordering region. The melt of the element 1 can then flow into pores and/or undercuts of the element 2 and, after cooling, produce a form-locking connection between the two elements 1 and 2.

The valve 10 can be inserted into an air spring cup of an air strut of an air spring system for a vehicle. The valve then acts as a residual pressure holding valve and thus allows a certain pressure to be held in the air strut. The desired pressure can be adjusted by means of the biasing spring 3. The stronger the biasing spring 3 is adjusted, the greater the required opposing force for overcoming the spring force is, i.e. the higher the residual pressure held in the air strut is, and vice versa. To be able to be inserted sealingly into a suitable opening, the valve 10 can have a sealing ring, such as an O ring (not represented), on its outer side, in particular on the outer side of the second element 2.

Figure 2A:
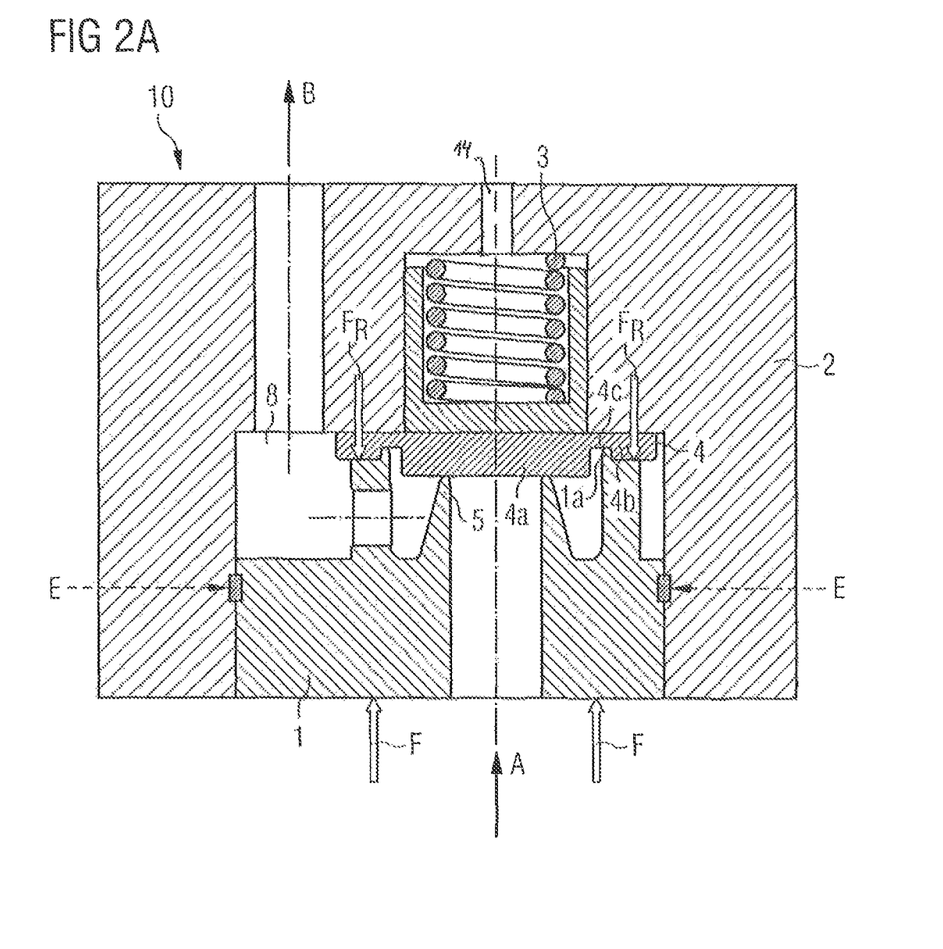
Figure 2B:
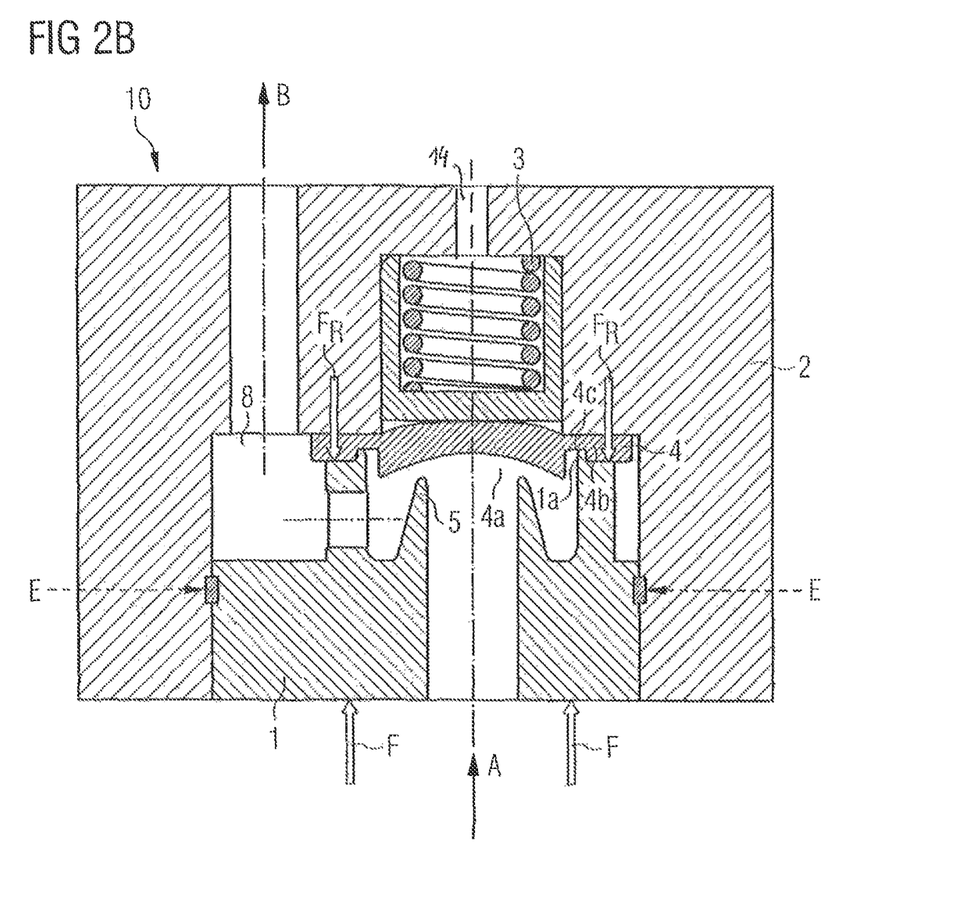

FIGS. 2A and 2B show a second exemplary embodiment of a valve, in particular for employment as a residual pressure holding valve in an air strut of an air spring system of a vehicle, in the closed and open positions, which differs from the exemplary embodiment according to FIGS. 1A and 1B substantially only in that the connecting interface at which the two elements 1 and 2 are interconnected by means of laser radiation E is parallel to the direction of the force F with which the valve body 4 is retained between the two elements 1 and 2. In this second exemplary embodiment, the element 1 is inserted into the gap 8 of the element 2 without coming to lie against the element 2 with a circumferential collar, as was the case in the exemplary embodiment according to FIGS. 1A and 1B. Instead, the force F with which the element 1 is urged into the gap 8 of the element 2 acts directly on the valve body 4. In this state, the two elements 1 and 2 can be welded together all around in a sealing manner preferably by the laser transmission method again. As a result, the force F is "frozen" as the reaction force or retaining force $F_R$ of the valve body 4. This does not require a part of the superficially melted material to be displaced.

To realize the connection between the two elements 1 and 2 by the laser transmission method, both elements can again consist of plastic with corresponding transmissivities or absorption properties for a certain wavelength of the laser radiation. Alternatively, the element 1 inserted into the gap 8 can for example be metallic and only the other element 2 consist of plastic that is transmissive to the laser radiation, which then superficially melts due to the heat transmission.

Figure 3:
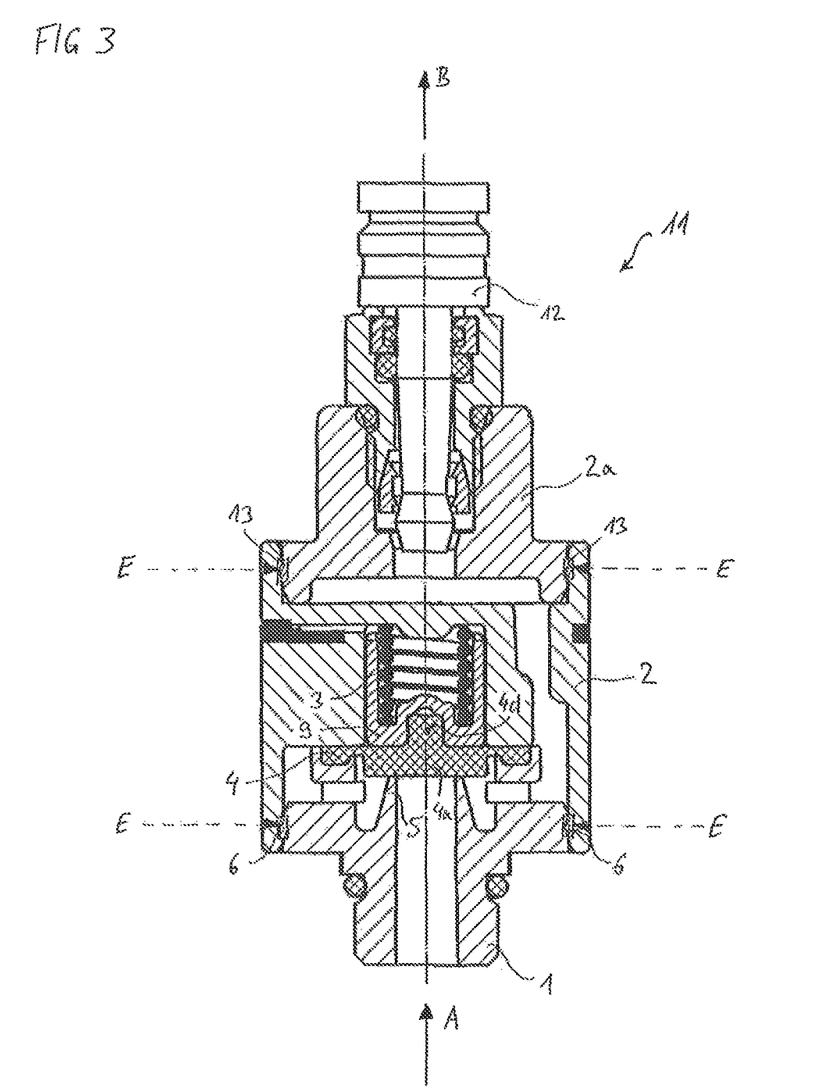

FIG. 3 shows a third exemplary embodiment of a valve 11 in the closed position. As in the second exemplary embodiment, the connecting interface 6 at which the two elements 1 and 2 are interconnected by means of laser radiation E is parallel to the direction of the force with which the valve body 4 is retained between the two elements 1 and 2. Additionally, the valve arrangement of this third exemplary embodiment has a third element 2a which is connected by means of laser radiation E to the second element 2 in a region 13. Like the connection of the first element 1 with the second element 2, the connection of the third element 2a with the second element 2 is effected by means of laser radiation E in the radial direction. In this exemplary embodiment, the first element 1 forms a lower element, the second element 2 a middle element, and the third element 2a an upper element. In particular, the third element 2a is arranged on a side of the valve body 4 opposing the first element 1. The third element 2a has a recess for receiving a port 12 in the valve outlet B. Due to the three-part configuration of the valve 11, the valve inlet A and the valve outlet B can be arranged coaxially, so that the valve 11 has a smaller dimension in the radial direction than the valve 10 according to the first and second exemplary embodiments.

As also in the other exemplary embodiments, the valve body 4 is configured as a membrane or sealing disk and urged against a sealing collar 5 axially via a sleeve 9 by means of a biasing spring 3 in order to close the valve passage. The valve body 4 has a lug 4d which engages a corresponding recess of the sleeve 9 in order to avoid a radial shift of the valve body 4. It will be appreciated that this can also be realized in the other exemplary embodiments.

To realize the connection between the three elements 1, 2, 2a by the laser transmission method, the elements can, as in the other exemplary embodiments, consist of plastic with corresponding transmissivities or absorption properties for a certain wavelength of the laser radiation, the middle element 2 being more strongly absorbent to the laser radiation used than the lower element 1 and the upper element 2a. Alternatively, the lower element 1 and the upper element 2a can be metallic for example and only the middle element 2 consist of plastic that is transmissive to the laser radiation, which then superficially melts due to the heat transmission.

Because the connection between the lower element 1 and the middle element 2 as well as the upper element 2a and the middle element 2 is effected by means of laser welding, a leakage-free seal of the valve arrangement is obtained. This requires no additional seals, so that the valve arrangement can be configured in a space-saving manner. Through the connection of the lower element 1 and the middle element 2 in the region 6 the valve body 4 is securely retained.

The valve 11 according to the third exemplary embodiment can, like the valve 10 according to the first and second exemplary embodiments, be employed as a residual pressure holding valve in an air spring system of a vehicle. In particular, the valve can be inserted into an air spring cup of an air strut and allows a residual pressure in the air strut to be held even when the air spring system is switched off or during transport or storage of the air strut over a long time period.

The invention claimed is:

1. A method for manufacturing a valve body arrangement, wherein a valve body is retained between a first element and a second element, comprising:
    arranging the valve body between the first and second elements in a first region, the first and second elements directly bordering on each other in a second region,
    connecting the first and second elements in the directly mutually bordering second region in a first welding or melting process such that the valve body is retained between the first and second elements in the first region, wherein during the connecting in the first welding or melting process a retaining force with which the valve body is clamped in between the first and second elements is adjusted by exerting a force on the first and second elements such that the valve body is clamped in between the first and second elements in the first region.

2. The method according to claim 1, wherein upon the connecting in the first welding or melting process, material of one of the first and second elements is partly displaced, so that the first and second elements move toward each other.

3. The method according to claim 1, wherein the connecting in the first and/or a second welding or melting process is carried out as a laser transmission method.

4. The method according to claim 1, wherein a third element is arranged such that a valve inlet and a valve outlet are arranged coaxially.

5. The method according to claim 1, wherein the first element, the second element and a third element comprise plastic material by means of which the elements are interconnected in a form-locking or material-locking manner in the first and a second welding or melting process in the first region and/or in a third region.

6. The method according to claim 1, wherein the first element and/or a third element comprises a first material which is partly or completely transmissive to laser radiation of a certain wavelength, and the second element comprises a second material which is completely absorbent to the same laser radiation, or at least more strongly absorbent than the first material, and that the first and second materials are interconnected in a form-locking or material-locking manner in the first and a second welding or melting process.

7. The method according to claim 1, wherein a connecting interface between the first and second elements and/or the first and a third element is perpendicular to a force direction with which the valve body is retained between the first and second elements in the second region.

8. The method according to claim 1, wherein a connecting interface between the first and second elements and/or the first and a third element is parallel to a force direction with which the valve body is retained between the first and second elements in the second region.

9. The method according to claim 1, wherein at least one of the first, the second and a third element comprises glass fiber reinforced plastic material.

10. The method according to claim 1, wherein at least one of the first, second and a third element is an injection molded part.

* * * * *